US006974660B2

(12) United States Patent
Manias et al.

(10) Patent No.: US 6,974,660 B2
(45) Date of Patent: Dec. 13, 2005

(54) METHOD FOR CONTROL OF TEMPERATURE-SENSITIVITY OF POLYMERS IN SOLUTION

(75) Inventors: Evangelos Manias, State College, PA (US); Mindaugas Rackaitis, State College, PA (US); Kenneth E Strawhecker, State College, PA (US)

(73) Assignee: Penn State Research Foundation, University Park, PA (US)

( * ) Notice: Subject to any disclaimer, the term of this patent is extended or adjusted under 35 U.S.C. 154(b) by 113 days.

(21) Appl. No.: 10/845,096

(22) Filed: May 14, 2004

(65) Prior Publication Data

US 2004/0209095 A1 Oct. 21, 2004

Related U.S. Application Data

(63) Continuation of application No. 10/389,672, filed on Mar. 14, 2003.
(60) Provisional application No. 60/365,468, filed on Mar. 15, 2002.

(51) Int. Cl.[7] .......................... G03C 5/00; B32B 27/00; C08G 63/44
(52) U.S. Cl. ..................... 430/314; 528/288; 528/300; 528/301; 528/307; 528/335; 428/425.8; 428/425.9; 428/474.4; 428/480
(58) Field of Search .......................... 430/314; 528/288, 528/300, 301, 307, 335

(56) References Cited

U.S. PATENT DOCUMENTS

| | | |
|---|---|---|
| 4,994,508 A | 2/1991 | Shiraki et al. |
| 5,147,923 A | 9/1992 | Mueller |
| 5,430,104 A | 7/1995 | Siol et al. |
| 5,444,097 A | 8/1995 | Tkacik |
| 5,519,109 A | 5/1996 | Kinzelmann et al. |
| 5,702,717 A | 12/1997 | Cha et al. |
| 5,929,214 A | 7/1999 | Peters et al. |
| 6,030,442 A | 2/2000 | Kabra et al. |
| 6,238,688 B1 | 5/2001 | Wu et al. |
| 6,426,086 B1 | 7/2002 | Papahadjopoulos et al. |
| 2003/0004258 A1 | 1/2003 | L'Alloret |

FOREIGN PATENT DOCUMENTS

| | | |
|---|---|---|
| JP | 60-190444 | 9/1985 |
| JP | 60-208336 | 10/1985 |
| JP | 61-066707 | 4/1986 |

OTHER PUBLICATIONS

M. Rackaitis et al., Water–Soluble Polymers with Tunable Temperature Sensitivity: Solution Behavior, Rapid Communication, Journal of Polymer Science: Part B: Polymer Physics, vol. 40, pp. 2339–2342.

Y. Nagasaki et al., "New Thermosensitive Rubbery Polymers. Synthesis of Poly (siloxyethyiene glycol) and Its Aqueous Solution Properties", Macromolecules 1996, 29, pp. 5859–5863.

L.D. Taylor et al., "Preparation of Films Exhibiting a Balanced Temperature Dependence to Permeation by Aqueous Solutions—A Study of Lower Consolute Behavior", Journal of Polymer Science: Polymer Chemistry Edition, vol. 13, 1975, pp. 2551–2570.

*Primary Examiner*—Samuel A. Acquah
(74) *Attorney, Agent, or Firm*—McDermott Will & Emery LLP

(57) ABSTRACT

Temperature sensitive, water soluble polymers are disclosed, together with a method for control the LCST of the polymer. The polymers include hydrophillic components and hydrophobic components joined by linking groups such as ester or amide groups wherein the hydrophilic components includes m ethylene oxide groups, the hydrophobic components consist of aliphatic groups such as n ethylenes and/or n cycloaliphatic groups, and where $1 \leq m \leq 30$ and $1 \leq n \leq 30$. Substrates bearing the grafted temperature responsive polymers also are disclosed. Microfluidic devices which include the temperature responsive polymers also are disclosed.

12 Claims, 1 Drawing Sheet

US 6,974,660 B2

METHOD FOR CONTROL OF TEMPERATURE-SENSITIVITY OF POLYMERS IN SOLUTION

This application is a CON of Ser. No. 10/389,672 filed Mar. 14, 2003, which claims priority to U.S. Provisional Application U.S. Ser. No. 60/365,468 filed Mar. 15, 2002.

BACKGROUND OF THE INVENTION

Many polymer solutions exhibit phase separation phenomena, which occur at specific temperatures characteristic of the concentration and the system (usually referred to as binodal temperatures or as cloud points). Above or below the cloud point temperature, the polymer is soluble and the solution is clear, but below or above this temperature, the polymer becomes insoluble and phase separates and the solution becomes opaque. In most polymer-solvent systems solubility decreases with falling temperature, but in some cases involving polar polymers, the opposite occurs and the polymer suddenly phase separate at a specific, higher temperature; the cloud-point temperature is in such cases a lower critical solution temperature (LCST). Polymer solutions in which the cloud point temperature occurs at low critical solution temperatures have been described in Japanese patent Nos. 85 190444; 85 208336; and 86 66707. These aqueous solutions include gels of poly-isopropylacrylamide and of isopropyl acrylamide/N-methylolacrylamide copolymers and of pyrrolidyl or piperidyl/acrylamide copolymers. Besides these acrylamides; N-iso-, N-n-, N-cyclopropylacrylamide and the corresponding methacrylamides are described in these patents, as well as N,N-diethylacrylamide as the only disubstituted acrylamide.

Thermally-sensitive polymers having an LCST in aqueous solution are well known in the art. See, e.g., Hoffman, A. "Intelligent Polymers" in Park, K, ed., Controlled Drug Delivery: Challenges and Strategies, American Chemical Soc., Washington, D.C. (1997). These polymers show fairly large physical changes (or transitions) in response to temperature, and have as a common property a balance of hydrophilic and hydrophobic groups. A thermally induced phase separation causes the release of hydrophobically bound water, and a resulting change in the conformation and properties of the polymer. The combination of a thermally sensitive polymer with a pH sensitive component can make the thermally-sensitive polymer sensitive to pH changes because the ionization, and thus hydrophilicity, of the pH-sensitive component can be changed by changing the pH.

Water soluble polymers with thermal sensitivity are of great scientific and technological importance. Such "smart" or "responsive" polymers are starting to find applications in pharmaceutical, biotechnological, chemical, and other such industries. For nonionic polymers, in most cases the thermosensitive character originates from the existence of a lower critical solution temperature ("LCST"), beyond which the polymer becomes insoluble in water.

Driven by the high promise for biomedical applications, polymers that exhibit a response in water at about 37° C. are of particular interest. The most commonly studied homopolymer (poly(N-isopropylacrylamide). PNIPAM), with a transition in water at 32° C. is not approved for human use. Furthermore, efforts to tailor the LCST of acrylamides to a temperature different than 32° C. by means of attaching hydrophobic or hydrophilic branches to these polymers, resulted in very broad transitions, that take place over tens of degrees centigrade, and do not correspond to the hydrophilic/hydrophobic balance. See, e.g. Laschewsky et al. "Tailoring of Stimuli-Responsive Water Soluable Acrylamide and Methacrylamide Polymers" Macromolec. Chem. Phys. 2001, vol 202, pg. 276–286. On the other hand, polyethylene oxide (PEO). which is currently used in many biomedical devices, has a LCST in water at about 150° C. rendering it of limited use for biomedical applications which require a temperature response.

A need therefore exists for polymers which show sharp transition temperature behavior in solution at lower temperatures. A further need exists for methods of manufacture of these polymers as well as methods for control of the transition behavior of the polymers.

SUMMARY OF THE INVENTION

Figure 1:
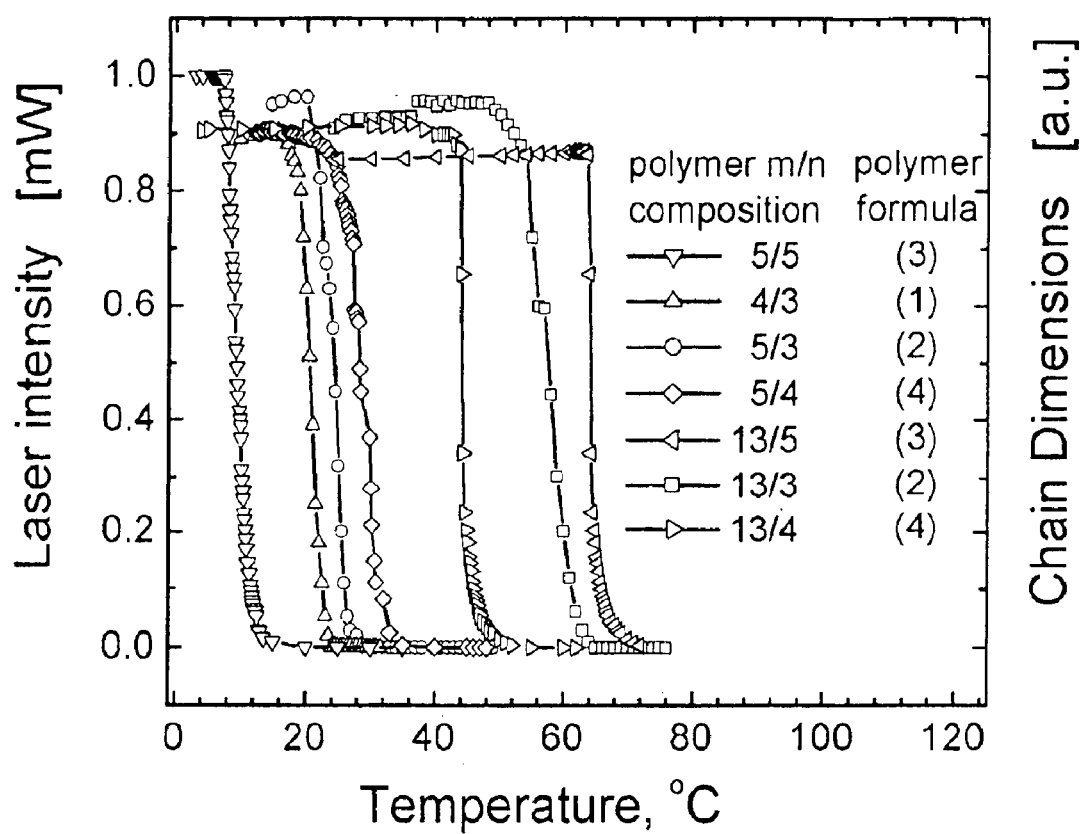
FIG. 1 shows the sharp phase transition behavior of various polymers of the invention such as selected polyesters and polyamides of the formulae (1),(2),(3), and (4) with varied m/n ratios, i.e. ethylene-oxide/ethylene ratios.

The present invention relates to water-soluble polymers containing both hydrophilic groups and hydrophobic groups. The LCST of the polymers in aqueous solution may be controlled by varying the fractions of the hydrophilic groups and hydrophobic groups, while maintaining certain polymer microstructures.

The present invention relates to temperature responsive polymers, and to control of the temperature-response of the polymers in aqueous solutions. The polymers represent a new class of temperature sensitive polymers which have controllable phase transition temperatures in water, and have applicability to drug delivery in response to temperature stimuli, cell adhesion control such as in substrates modified by these polymers, and microflow control such as in microfluidic devices.

In a first aspect, linear polymers such as linear polyesters were synthesized from monomers which include hydrophilic ethylene-oxide units and hydrophobic ethylene units. By control of the fractions of the hydrophilic monomer and hydrophobic monomer in the polymer, the LCST of the polymer in solution may be controlled over a wide temperature range.

In another aspect, the invention relates to temperature sensitive, aqueous polymer compositions. The compositions include linear copolymers that has a lower critical solution temperature of about 7° C. to about 70° C. The copolymers include hydrophilic components and hydrophobic components. Preferably, the hydrophilic component includes (ethylene oxide) groups and the hydrophobic component is an aliphatic chain includes ethylene groups. The phase separation temperature of the aqueous solution can be controlled by varying the relative lengths of the hydrophilic and the hydrophobic components in an alternating or random copolymer microstructure.

Advantageously, the invention achieves Thermosensitive, water soluble polymers which exhibit a typical polymer-solvent phase behavior. In addition, the invention achieves a method for control of the temperature response of the polymers by varying the molar fractions of amounts of hydrophobic components(n) and hydrophilic components (m).

In a preferred aspect, the invention relates to a temperature sensitive, water soluble polymer of formula (1)

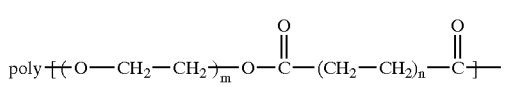

that includes a hydrophilic component and a hydrophobic component joined by a linking group wherein the hydrophilic component includes m (ethylene oxide) groups, the hydrophobic component includes n ethylene groups, and the linking group is an ester, and where $1 \leq m \leq 30$ and $1 \leq n \leq 30$. More preferably in the polymer of formula 1, m=4 and n=3; m=5 and n=3; m=13 and n=3; m=5 and n=5; and m=13 and n=5.

In another preferred aspect, the invention relates to a temperature sensitive, water soluble polyester of formula (2)

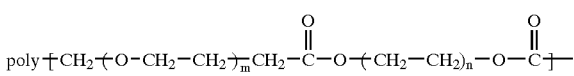

that includes a hydrophilic component and a hydrophobic component joined by a linking group wherein the hydrophilic component includes m (ethylene oxide) groups, the hydrophobic component includes n ethylene groups and the linking group is an methylene-ester group, where $1 \leq m \leq 30$ ethylene oxide and $1 \leq n \leq 30$ ethylene. More preferably, in the polymer of formula (2), m=5 and n=6; m=13 and n=6; m=5 and n=3; and m=13 and n=3.

In yet another preferred aspect, the invention relates to a temperature sensitive, water soluble polyamide of formula (3)

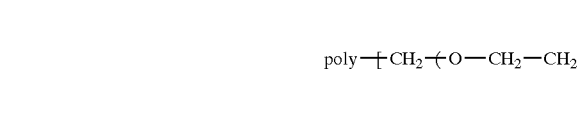

that includes a hydrophilic component and a hydrophobic component joined by a linking group wherein the hydrophilic component includes m (ethylene oxide) groups, the hydrophobic component includes n ethylene groups, and the linking group is an amide group, where $1 \leq m \leq 40$ ethylene oxide and $1 \leq n \leq 30$ ethylene. More preferably, m=5 and n=5; m=13 and n=5; m=13 and n=3.

In a further preferred aspect, the invention relates to a temperature sensitive, water soluble polyamide of formula (4)

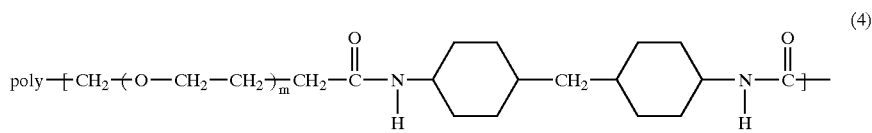

that includes a hydrophilic component and a hydrophobic component joined by a linking group wherein the hydrophilic component includes m (ethylene oxide) groups, the hydrophobic group is methylene-biscyclohexanamine and the linking group is an amide, where $1 \leq m \leq 40$ ethylene oxide. More preferably, m=5; m=13.

The invention also relates to substrates which bear a grafted temperature responsive polymer. In this aspect, the invention relates to a substrate material having a self assembled monolayer thereon, and a temperature responsive polymer of any of formulae (1) to (4):

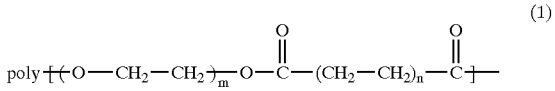

where $1 \leq m \leq 30$ and $1 \leq n \leq 30$,

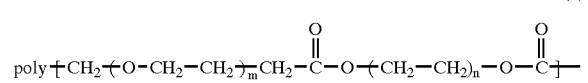

where $1 \leq m \leq 30$ ethylene oxide and $1 \leq n \leq 30$ ethylene,

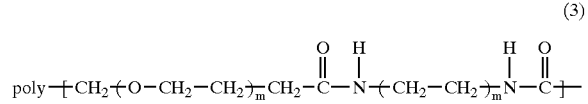

where $1 \leq m \leq 40$ ethylene oxide and $1 \leq n \leq 30$ ethylene, and

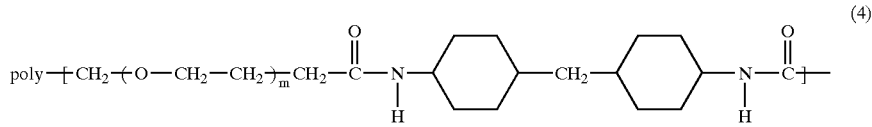

where $1 \leq m \leq 40$ ethylene oxide.

Preferably, the substrate material is any of metal, metal oxide, ceramic, semiconductor, polymer, glass and silicon, and a mixed self assembled monolayer. The mixed monolayer includes methyl terminated molecules such as alkylsilanes, preferably trichloro-C2 to C18-alkyls, methoxy or ethoxy silane-C2 to C18-alkyls and thiol-C2 to C18-alkyls. The mixed monolayer also includes a specific concentration of α,ω-functionalized molecules selected from the group that have α-functionalizations such as chloro-silanes, ethoxysilanes, methoxysilanes, and thiols, and ω-functionalizations such as amino, carboxy, nitrile, cyanide, anhydride, epoxide, and hydroxy. The concentration of the mixed monolayers, as defined by the molar ratio of the ω-functionalized molecules to the methyl-terminated molecules, determines the grafting density of the end-tethered polymer. In a more preferred aspect, the grafted polymer is that of formula (1) wherein (m/n)=4/3, the substrate material is glass and the self assembled monolayer is aminopropyltriethoxy silane. In another more preferred aspect, the grafted polymer is any of those of formula (2) wherein (m/n)=13/3, of formula (3), and wherein (m/n)=13/5, of formula (4) wherein m=13.

The invention also relates to a microfluidic device that includes a temperature responsive polymer decorating one or more of the microfluidic channel walls. In a preferred aspect, the device includes a glass substrate bearing a grafted polymer thereon, electrodes in contact with the substrate, a fluid therebetween, a microchannel grid in contact with the substrate whereby micro channels of the grid face the substrate and cover the electrodes to confine the conductive fluid to the microchannels. The grafted polymer is that of formula 2 where m=13 and n=6.

Having summarized the invention, the invention will now be described in detail below by reference to the following non-limiting examples.

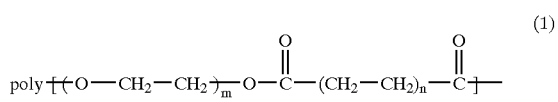

where $1 \leq m \leq 30$ ethylene oxide and $1 \leq n \leq 30$ ethylene, the polyester of formula (2)

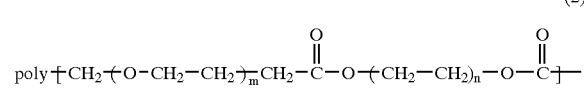

where $1 \leq m \leq 30$ ethylene oxide and $1 \leq n \leq 30$ ethylene, and polyamides of formula (3)

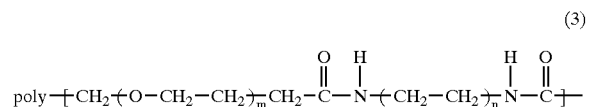

where $1 \leq m \leq 40$ ethylene oxide and $1 \leq n \leq 30$ ethylene, and

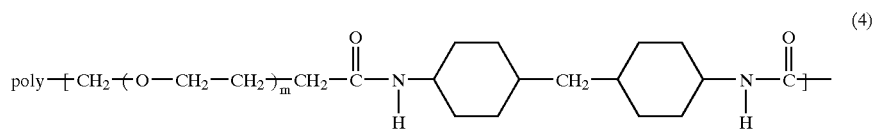

DETAILED DESCRIPTION OF THE INVENTION

Materials

All chemicals, unless otherwise stated, were purchased from Sigma-Aldrich and used as received.

The term "thermally-sensitive" as used herein refers to a molecule which changes in conformation or properties in response to changes in environmental temperature. As used herein, the term refers to molecules which exhibit such changes in the temperature range of about 6° C. to about 120° C., where the transition temperature is controlled by the polymer composition and microstructure.

The term "lower critical solution temperature" (LCST) generally refers to the basic thermodynamics of polymer mixtures and polymer solutions, and represents the lower point at which polymer mixtures or solutions separate into two phases. LCST refers to one particular concentration (critical concentration) of the mixture or solution, where the phase separation occurs at the lowest temperature. For all other concentrations the transition temperature is referred to as binodal point or cloud point. See generally, Kroschwitz, ed, Kirk-Othmer Encyclopedia of Chemical Technology John Wiley & Sons New York 19:837–904 ($4^{th}$ ed., 1996); Hoffman, A. "Intelligent Polymers" in Park, K, ed., Controlled Drug Delivery: Challenges and Strategies, American Chemical Soc., Washington, D.C. (1997). As used herein, cloud point means the temperature at which a polymer (whether a homopolymer or a copolymer) undergoes phase transition from soluble to insoluble. Specifically, below the cloud point, the polymer is soluble in water and, above it, the polymer precipitates from the solution.

The temperature sensitive, water soluble polymers of the invention include polyesters, polyamides and polyanhydrides, preferably polyesters of formula (1) the polyamides of formula (4) where $1 \leq m \leq 40$ ethylene oxide.

In the polymers of formulae (1)–(4) the monomer structure includes hydrophillic groups and hydrophobic components that are alternated across the polymer and interconnected (to each other and among the same) by linking groups. The hydrophilic and hydrophobic groups may alternate (as in formulae (1)–(4)) or may be randomly distributed in the backbone, side chains, and/or branches of the polymer. The polymers may include uncross-linked chains or may be a cross-linked network. The temperature sensitive polymers show a sharp LCST, and/or transition between swollen and collapsed chain conformations in solution, at a specific transition temperature for each polymer.

Control of the LCST of the temperature sensitive polymers entails two design principles: (1) control of the composition of the polymer by control of the m/n fraction (where, m is the number of hydrophilic groups, and n is the number of hydrophobic groups which constitute the polymer), and (2) dispersment of the hydrophilic and hydrophobic groups in the polymer structure so that there are preferably less than 30–50 similar (all hydrophobic or all hydrophilic) group units bonded together. The temperature sensitive polymers may have blocks, grafts, branches, and the like, but in these embodiments the blocks, grafts, and branches preferably are free of large sequences of hydrophilic only (or hydrophobic only) groups.

The hydrophilic groups may include a wide variety of hydrogen-bonding, water-soluble groups. Most preferably, the hydrophilic group is ethylene oxide (EO). Other useful hydrophilic groups include methylene oxide, vinyl alcohol, acrylamide, acrylate, propylene oxide, and weak organic acids such as acrylic-acid, methacrylic-acid, methyl-acrylic-acid and the like.

Numerous compounds may be used as a source of the hydrophillic group. Where EO is the hydrophilic group, useful source compounds include any polymerizable small molecule that includes the above mentioned m number of EO groups, such as ethylene oxide, difunctional oligo (ethylene oxide) molecules, and polymerizable monomer with pending oligo(ethylene oxide) groups, preferably but not limited to ethylene oxide, oligo(ethylene oxide)-diamines, oligo(ethylene oxide)-diacids, oligo(ethylene oxide)-diols, oligo(ethylene oxide)-divinyls, oligo(ethylene oxide)-diepoxides, oligo(ethylene oxide) amino acids, and the like Where methylene oxide is the hydrophilic group, useful source compounds include polymerizable molecules which contain methylene oxide groups, such as difunctional oligo (methylene oxide), vinyl monomers which include oligo (methylene oxide), and polymerizable molecules which include pending oligo(methylene oxide), preferably oligo (methylene oxide) diacids, oligo(methylene oxide)-diols, oligo(methylene oxide)-diacids, oligo(methylene oxide)-diepoxides, oligo(methylene oxide)-amino acids, and the like.

Where vinyl alcohol is the hydrophilic group, useful source compounds include polymerizable molecules which contain vinyl alcohol groups, and polymerizable molecules which contain groups which may be transformed to vinyl-alcohols, as for example vinyl acetate, preferably vinyl alcohol, vinyl acetate, difunctional vinyl acetates.

Where weak organic acids are the hydrophobic groups, useful source compounds include polymerizable molecules which contain acrylic and/or methacrylic acid, and polymerizable molecules which contain groups which may be transformed to the same acids, preferably acrylic acid, oligo (acrylic acid), difunctional-oligo(acrylic acid), methyl acrylate, methyl methacrylate, and combinations of thereof.

A wide variety of compounds also may be used as a source of the hydrophobic group and the linking group. Examples of hydrophobic groups which may be used include but are not limited to the following groups and the combinations of two or more thereof: aliphatic groups preferably oligomers of 1–20 units of ethylene, or propylene, or isobutelene, and/or mixtures of thereof, C4–C10 cycloaliphatic groups preferably cyclopropane, cyclobutane, cyclopentane, cyclohexane, furan, vinyl groups, acrylic groups such as acrylonitriles, methyl-methacrylate, and semi-inorganic acrylic, aromatic groups such as benzene, phenylene, carbohydrate groups such as amylose, cellulose, cellulose nitrade, diene groups such as butadiene, chlorotrene, isoorene, norbornene, anhydrite groups or pending anhydride groups, amine groups such as primary, secondary, tertiary, quaternary amines, imines, amino acids, DNA/RNA bases, and heterocyclic amines, imide groups, amide groups, ester groups, ether groups, ketone groups, sulfone and ether sulfone groups, nitrile groups, peptide groups such as protein groups, alanine, glutamate, collagen, gelatin, glycine, and lysine, saccharide groups, silane groups such as methyl-phenyl-silylene, mono-alkyl- and di-alkyl-silylene, silazane groups such as silazane, mono-alkyl- and dialkyl-silazane, urethane groups, urea groups, vinylidene groups such as chlorides, fluorides, isobutylene, multi-fluoro- and multi-chloro-alkenes, and fluoropolymer groups such as tetrafluoro-ethylene, perfluorinated and semifluorinated ethers, fluoro vinyledenes, perfluorinated and semifluorinated aromatic rings, and perfluorinated or semifluorinated C4–C10 cyclo aliphatics.

The linking groups may include aliphatic carbon-carbon bonds, alkylene carbon-carbon bonds, alkyne carbon-carbon bonds, imides, anhydrides, ureas, urethanes, sulfones, ethers, carbonates, peptide bonds, oxygen, sulfur, dienes, aromatic bonds/groups, ketones, silane/siloxane links, acrylics, and the like, preferably esters, amides, and anhydrides.

In a preferred aspect, where the hydrophobic group is ethylene and the linking group is an ester, useful compounds for providing the hydrophobic groups include diacids and dialcohols of the hydrophobic groups, preferably C1–C50-alkene-diacid and C1–C50 alkene dialcohols, and cycloaliphatic-diacids.

In a preferred aspect, where the hydrophobic group is ethylene and the linking group is an amide, useful compounds for providing the hydrophobic group include diacids and diamines of these groups, preferably C1–C50-alkene-diacid and C1–C50 alkene diamines, cycloaliphatic-diacids, and cycloaliphatic diamines.

In a preferred aspect, where the hydrophobic group is ethylene and the linking group is an anhydride, useful compounds for providing the hydrophobic group include diacids, diacid chlorides, anhydrates and dianhydrides of these groups, preferably C2–C10 alkane acid chloride, maleic anhydride, aromatic anhydrides and dianhydrides.

The temperature sensitive polymers show a sharp LCST in a variety of solvents and in the presence of a wide variety of additives. Useful solvents contain entities which hydrogen bond to hydrophilic groups such as ethylene oxide. Useful solvents include water, alcohols such as methanol, ethanol, propanol, isopropanol, butanol, and THF as well as mixtures thereof. Advantageously, various additives may be included in the polymer solutions without affecting the nature of the LCST transition behavior of the polymer, although the temperature onset of the transition may be affected. Examples of these additives include but are not limited to salts preferably such as sodium chloride, potassium chloride, buffer solutions and their components, biological serums and their components, organic acids such as acetic acid, propanoic acid, butanoic acid benzoic acid, inorganic acids such as sulfuric acid, hydrogen chloride, bases such as sodium hydroxide, potassium hydroxide, lithium hydroxide, calcium hydroxide, organics such as hexane, toluene, DMSO, acetonitrile, ethane diol, and crystalline and/or colloidal inorganics such as silica, alumina, silicates, and the similar.

Synthesis

The temperature responsive polymers of may be made by Chain-Growth Polymerization by using two alternative methods. In the first method refereed to as the alternating polymer microstructure method, copolymers are synthesized using two or more types of short molecules that are complementary multi-functional. For example, one monomer has two functional groups A, and the other monomer has two functional groups B, where A-B can react but A-A and B-B cannot react (that is, the functional groups react only with each other, and do not react with the same). Where one molecule contains hydrophilic groups and other molecule(s) contain hydrophobic groups, this method produces an alternating sequence of hydrophilic-alt-hydrophobic components, and the A-B reaction product will be the linking group. Where all of the molecules are bifunctional, linear polymer chains will be formed. Where any of the molecules have more than two functional groups, e.g. trifunctional or tetrafunctional, branching and cross-linking results.

In a second method referred to as the random polymer microstructure, random copolymers are synthesized using two or more types of short molecules that are multi-functional, e.g. the one molecule contains A and B functional groups and the other molecule contains C and D functional groups, where all functional groups chosen to react with each other (that is, A reacts with B, C, and/or D; B reacts with A, C, and/or D, etc). In this embodiment, the functional group pairs have similar reactivity so as to promote random sequences and depress block- or homo-polymer sequences. Where one molecule contains hydrophilic groups and the other molecule(s) contain hydrophobic groups, this method produces a random sequence of hydrophilic-random-hydrophobic components, and the A-B-C-D reaction products are linking groups. Where all molecules are bifunctional, linear polymer chains are formed. Where any of the molecules have more than two functional groups, e.g. trifunctional or tetrafunctional, branching and cross-linking result. Examples of monomers which may be used in this method include amino(m)(ethylene oxide) carboxylic acid, amino(n)ethylene carboxylic acid, hydroxy(m)(ethylene oxide) carboxylic acid, hydroxy(n)ethylene carboxylic acid and similar.

The polymers of the invention also may be produce by addition polymerization. In this method, copolymers that include hydrophilic and hydrophobic components are synthesized by addition polymerization (e.g. free radical, anionic, cationic, catalyst assisted, ring opening, and the similar) of two or more appropriate molecules. Such molecules contain sites wherefrom addition polymerization can propagate (e.g. double or triple carbon bonds, or ring molecules, etc), and one of them contains hydrophilic groups and the other contains hydrophobic groups. The reactivity ratios and the feed in the corresponding copolymer equation are chosen (or set by the reaction conditions) to promote random or alternating sequences and depress block- or homo-polymer sequences [see for example: chapter 5 of P. C. Painter and M. M. Coleman "Fundamentals of Polymer Science" Technomic Publishing Co, $2^{nd}$ edition, 1997]. Where one molecule contains hydrophilic groups and the other molecule(s) contain hydrophobic groups and the reactivity ratios are all set to zero or to very small values close to zero, alternating sequences are mainly produced. Where one molecule contains hydrophilic groups and the other molecule(s) contain hydrophobic groups, and the reactivity ratios are all set to one or to values very close to one, random sequences are mainly produced, with a copolymer composition that reflects that of the feed. Where cross-linking groups are introduced and/or chain transfer to the chain and/or short chain branching can occur, branching and cross-linking results.

Synthesis of the temperature sensitive polymers advantageously entails control of the fractions of the hydrophilic groups and the hydrophobic groups which constitute the polymer, and control of the polymer microstructure. The hydrophilic and hydrophobic groups are well dispersed in the polymer, and are preferably less than 20–50 similar (all hydrophobic or all hydrophilic) group units bonded together. The polymer may have blocks, grafts, branches, and the like, but in these embodiments each of the blocks, grafts, and branches preferably are free of large sequences of hydrophilic only (or hydrophobic only) groups.

Depending on the chemistry of the polymer molecule where a hydrophilic group such as EO is incorporated, different synthesis schemes may be used to make the polymer. For example, difunctional molecules such as diamines, dialcohols, diacids, organometalics and combinations thereof, such as amino acids, which include hydrophobic groups such as ethylene ("EE"), and complementary difunctional molecules which include hydrophilic groups such as EO may be polymerized by chain-growth schemes such as polycondensation.

Where the hydrophilic and/or hydrophobic groups are included in vinyl molecules or rings, polymerization may be performed by chain-addition schemes such as free radical polymerization, cationic/anionic polymerization, and catalyst-aided polymerization.

The invention will now be illustrated in further detail below by reference to the following non-limiting examples:

EXAMPLES 1–5

Polyesters of Formula (1)

The polyesters of formula (1) generally may be produced by a polycondensation reaction where poly(m)ethylene glycol is reacted with dicarboxychloride poly(ethylene). In these examples, m represents the number of EO groups and n represents the number of EE groups.

Example 1

Synthesis of Polyester of Formula (1) where Ratio of (m/n)=4/3

0.01 mol of poly(ethylene glycol), MW=200 g/mol is mixed with 0.005 mol of 1,6-hexanedicarboxychloride (suberoyl chloride) in 40 mL of tetrahydrofuran (THF) solvent to form a solution. Solid NaOH, in an amount of 0.2 g, is present in the solution as a catalyst. The solution is heated to 90° C. Then, an additional 0.005 mol of 1,6-hexanedicarboxychloride is added drop-wise over a period of 2 hours to the solution. The resulting solution is maintained under reflux conditions at 90° C. for 10 hours. The THF solvent is fully evaporated and the residue is deposited into 100 mL of absolute ethanol to form a second solution. The second solution is placed into a separatory funnel where insoluble inorganic side products (e.g. NaCl) are separated from the polymer solution in absolute ethanol. The ethanol is evaporated at 50° C. to obtain the polyester of formula (1) where m/n=4/3. The high molecular weight fractions of the polyester (degree of polymerization more than 100) are separated using centrifuge.

Example 2

Synthesis of Polyester of Formula (1) where Ratio of (m/n)=5/3

The procedure of example 1 is employed except that poly(ethylene glycol) of Mw=250 g/mol is used for reaction with 1,6-hexanedicarboxychloride.

Example 3

Synthesis of Polyester of Formula (1) where Ratio of (m/n)=13/3

The procedure of example 1 is employed except that poly(ethylene glycol) of Mw=600 g/mol is used for reaction with 1,6-hexanedicarboxychloride.

Example 4

Synthesis of Polyester of Formula (1) where Ratio of (m/n)=5/5

The procedure of example 1 is employed except that poly(ethylene glycol) of Mw=250 g/mol is used and 1,10-decanedicarboxychloride is substituted on a 1:1 molar basis for 1,6-hexanedicarboxychloride.

Example 5

Synthesis of Polyester of Formula (1) where Ratio of (m/n)=13/5

The procedure of example 4 is employed except that poly(ethylene glycol) of Mw=600 g/mol is used for reaction with 1,10-decanedicarboxychloride

EXAMPLES 6–9

Synthesis of Polyesters of Formula (2)

Generally, the polyesters of formula (2) may be produced by chlorinating $\alpha,\omega$bis(carboxymethyl)-poly(m)ethyleneoxide and reacting the product thereof with $\alpha,\omega$-diol-poly(n)ethylenes.

Example 6

Polyesters of Formula (2) where (m/n)=5/6

3.609 g of α,ωbis(carboxymethyl)-poly(m)ethyleneoxide (m=5), MW=250, is chlorinated with 4 mL of neat thionyl chloride. The chlorination is done in 100 mL THF at 80° C. for 12 hours while stirring to produce ethylene oxide diacid chloride. The diacid chloride is extracted by evaporating the THF and unreacted thionyl chloride at 110° C. Then, all of the ethylene oxide diacid chloride is dissolved in 50 mL THF and mixed with 100 mL of a first solution formed from 2.9 g of 1,12 dodecane diol and 200 mL THF in the presence of 0.2 g solid NaOH catalyst to produce a reaction mixture. Then the mixture is allowed to react at 150° C. for 24 hours. During the first 12 hours of the reaction an additional 100 mL of the first solution of 1,12-dodecane diol and THF is added dropwise to the reaction mixture. The resulting polyester of formula (2) where m=5 and n=6 is separated from the inorganic side products and unreacted monomers by using the procedure as used in Example 1.

Example 7

Polyesters of Formula (2) where (m/n)=13/6

9.45 gms of α,ωbis(carboxymethyl)-poly(m)ethyleneoxide (m=13), MW=600, is chlorinated with 4 mL of neat thionyl chloride. The chlorination is done in 100 mL THF at 80° C. for 12 hours while stirring to produce ethylene oxide diacid chloride. The diacid chloride is extracted by evaporating the THF and unreacted thionyl chloride at 110° C. Then, all of the ethylene oxide diacid chloride is dissolved in 50 mL THF and mixed with 100 mL of a first solution formed from 2.9 g of 1,12-dodecane diol and 200 mL THF in the presence of 0.2 g solid NaOH catalyst to produce a reaction mixture. Then the mixture is allowed to react at 150° C. for 24 hours. During the first 12 hours of the reaction an additional 100 mL of the first solution of 1,12-dodecane diol and THF is added dropwise to the reaction mixture. The resulting polyester of formula (2) where m=13 and n=6 is separated from the inorganic side products and unreacted monomers by the procedure used in Example 1.

Example 8

Polyesters of Formula (2) where (m/n)=5/3

3.6 gms of α,ωbis(carboxymethyl)-poly(m)ethyleneoxide (m=5), MW=250, is chlorinated with 4 mL neat thionyl chloride. The chlorination reaction is done in 100 mL THF at 80° C. for 12 hours while stirring to produce ethylene oxide diacid chloride. The diacid chloride is extracted by evaporating the THF and unreacted thionyl chloride at 110° C. Then, all of the ethylene oxide diacid chloride is dissolved in 50 mL THF and mixed with 25 mL of a first solution formed from 1.71 g of 1,6-hexane diol and 50 mL THF in the presence of 0.2 g solid NaOH catalyst to produce a reaction mixture. Then the mixture is allowed to react at 150° C. for 24 hours. During the first 12 hours of the reaction an additional 25 mL of the first solution of 1,6-hexane diol and THF is added dropwise to the reaction mixture. The resulting polyester of formula (2) where m=5 and n=3 is separated from the inorganic side products and unreacted monomers by using the procedure used in Example 1.

Example 9

Polyesters of Formula (2) where (m/n)=13/3

9.45 gms of α,ωbis(carboxymethyl)-poly(m)ethyleneoxide (m=13), MW=600, is chlorinated with 4 mL of neat thionyl chloride. The chlorination is done in 100 mL THF at 80° C. for 12 hours while stirring to produce ethylene oxide diacid chloride. The chloride is extracted by evaporating the THF and unreacted thionyl chloride at 110° C. Then, all of the ethylene oxide diacid chloride is dissolved in 50 mL THF and mixed with 25 mL of a first solution formed from 1.86 g of 1,6-hexane diol and 50 mL THF in the presence of 0.2 g solid NaOH catalyst to produce a reaction mixture. Then the mixture is allowed to react at 150° C. for 24 hours. During the first 12 hours of the reaction an additional 25 mL of the first solution of 1,6-hexane diol and THF is added dropwise to the reaction mixture. The resulting polyester of formula (2) where m=13 and n=3 is separated from inorganic side products and unreacted monomers by using the procedure employed in Example 1.

Example 9A

Poly(Ethylene Oxide) Made Without Use of Hydrophobic Monomer

For comparison, Poly(ethylene oxide) which is a polymer which includes an ether linking group is made. The Poly(ethylene oxide) is made using the anionic ring opening polymerization method. In this method, 0.01 mol of sodium hydroxide and 0.01 mol of ethanol is added to a 10% aqueous solution of ethylene oxide. The mixture is refluxed for 12 hours at 90 C. Then the mixture is evaporated, and the residue is dissolved in 50 mL absolute ethanol and filtered to remove inorganic side products. Then the polymer is recrystalized from the ethanol solution by mixing it with 500 mL toluene.

EXAMPLES 10–14

Synthesis of Polyamides of Formula (3)

Generally, synthesis of the polyamides of formula (3) entails reaction of ethylene oxide diacid chloride and an aliphatic diamine. Synthesis of various polyamides of formula (3) are shown below:

Example 10

Polyamide of Formula (3) where (m/n)=5/5

15.4 g bis(carboxymethyl)(5)-ethyleneoxide is chlorinated using 10 mL of neat thionyl chloride in 100 mL of THF at 80° C. reflux for 12 hours. The resulting ethyleneoxide diacid chloride is extracted by evaporating the THF solvent and excess thionyl chloride at 110° C. The ethyleneoxide diacid chloride is dissolved in 100 mL chloroform and placed in an ice bath (0° C.). 10.61 g of 1,10-diaminodecane is dissolved in 100 mL of chloroform and is added to the ethylene oxide diacid chloride solution drop wise over the period of 12 hours while mixing. After all of the 1,10-diaminodecane is added, the resulting solution is mixed for 6 hours, and then slowly heated to 80° C. to evaporate the chloroform and to produce the polymer. Polymer separation is done as in example 1.

Example 11

Polyamide of Formula (3) where (m/n)=13/5

24.92 g bis(carboxymethyl)(13)-ethyleneoxide is chlorinated using 10 mL of neat thionyl chloride in 100 mL of THF at 80° C. reflux for 12 hours. The resulting ethyleneoxide diacid chloride is extracted by evaporating the THF solvent and excess thionyl chloride at 110° C. The ethyleneoxide diacid chloride is dissolved in 100 mL chloroform and placed in an ice bath (0° C.). 7.18 g of 1,10- diaminodecane is dissolved in 100 mL of chloroform and is added to the ethylene oxide diacid chloride solution drop wise over the period of 12 hours while mixing. After all of the 1,10-diaminodecane is added, the resulting solution is mixed for 6 hours, and then slowly heated to 80° C. to evaporate the chloroform and to produce the polymer. Polymer separation is done as in example 1.

Example 12

Polyamide of Formula (3) where (m/n)=13/3

24.92 g bis(carboxymethyl)(13)-ethyleneoxide is chlorinated using 10 mL of neat thionyl chloride in 100 mL of THF at 80° C. reflux for 12 hours. The resulting ethyleneoxide diacid chloride is extracted by evaporating the THF solvent and excess thionyl chloride at 110° C. The ethyleneoxide diacid chloride is dissolved in 100 mL chloroform to produce an ethyleneoxide diacid chloride solution and placed in an ice bath (0° C.). 4.83 g of 1,6-diaminohexane is dissolved in 100 mL of chloroform and is added to the ethylene oxide diacid chloride solution drop wise over the period of 12 hours while mixing. After all of the 1,6-diaminohexane is added, the resulting solution is mixed for 6 hours, and then slowly heated to 80° C. to evaporate the chloroform and to produce the polymer. Polymer separation is done as in example 1.

EXAMPLES 13–14

Polyamides of Formula (4)

Generally, manufacture of the polyamides of formula(4) entail reaction of ethylene oxide diacid chloride and an alkylenecycloaliphatic amine. Manufacture of various polyamides of formula (4) are shown below:

Example 13

Polyamide of Formula (4) where (m/n)=5/4 where n=4 is the Thermodynamic Equivalent of the Cycloaliphatic Hydrophobic Group of a Linear Ethylene 21 g bis(carboxymethyl)(5)-ethyleneoxide is chlorinated using 10 mL of neat thionyl chloride in 100 mL of THF at 80° C. reflux for 12 hours. The resulting ethyleneoxide diacid chloride is extracted by evaporating the THF solvent and excess thionyl chloride at 110° C. The ethyleneoxide diacid chloride is dissolved in 100 mL chloroform to produce an ethyleneoxide diacid chloride solution and placed in an ice bath (0° C.). 17.4 g of 4,4'-methylene-bis(cyclo-hexanamine) is dissolved in 100 mL of chloroform and is added to the ethylene oxide diacid chloride solution drop wise over the period of 12 hours while mixing. After all of the 4,4'-methylene-bis(cyclo-hexanamine) is added, the resulting solution is mixed for 6 hours, and then slowly heated to 80° C. to evaporate the chloroform and to produce the polymer. Polymer separation is done as in example 1.

Example 14

Polyamide of Formula (4) where (m/n )=13/4 where n=4 is the Thermodynamic Equivalent of the Cycloaliphatic Hydrophobic Group of a Linear Ethylene 24.92 g bis(carboxymethyl)(13)-ethyleneoxide is chlorinated using 10 mL of neat thionyl chloride in 100 mL of THF at 80° C. reflux for 12 hours. The resulting ethyleneoxide diacid chloride is extracted by evaporating the THF solvent and excess thionyl chloride at 110° C. The ethyleneoxide diacid chloride is dissolved in 100 mL chloroform to produce an ethyleneoxide diacid chloride solution and placed in an ice bath (0° C.). 8.72 g of 4,4'-methylene-bis(cyclo-hexanamine) is dissolved in 100 mL of chloroform and is added to the ethylene oxide diacid chloride solution drop wise over the period of 12 hours while mixing. After all of the 4,4'-methylene-bis(cyclo-hexanamine) is added, the resulting solution is mixed for 6 hours, and then slowly heated to 80° C. to evaporate the chloroform and to produce the polymer. Polymer separation is done as in example 1.

Example 15

Polyanhydride where (m/n)=13/3

0.1 mol bis(carboxymethyl)(13)-ethyleneoxide is chlorinated using 0.2 mol of neat thionyl chloride in 100 mL of THF at 80° C. reflux for 12 hours. The resulting ethyleneoxide diacid chloride is extracted by evaporating the THF solvent and excess thionyl chloride at 110° C. The ethyleneoxide diacid chloride then is dissolved in 100 mL dimethyl chloride and placed in an ice bath (0° C.). 0.01 mol of triethylamine is added to the solution and used as a catalyst.

0.1 mol of octanedioic acid is dissolved in 100 mL of dimethyl chloride and is added to the ethylene oxide diacid chloride solution drop wise over the period of 12 hours while mixing. After all of the octanedioic acid is added, the resulting solution is mixed for 6 hours, and then slowly heated to 80 C to evaporate the dichloromethane and to produce the polymer. Polymer separation is done as in example 1.

The anhydride polymer produced has the structure of formula (5) where (m/n)=13/3:

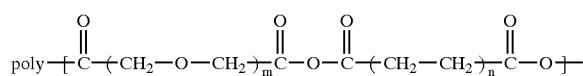

(5)

Characterization

The polyesters of formulae (1) and (2) are characterized by aqueous gel permeation chromatography (GPC) with a Polymer Laboratories GPC, bearing PL Aquagel-OH columns. A set of various molecular weight poly (ethyleneoxide) standards are used for the calibration of the GPC. The polyamides of formulae (3) and (4) are characterized by static light scattering using ethanol solutions by Dawn DSP-F Laser Photometer of Wyatt Technology. Molecular weights and polydispersities are given in tables 1A–1C.

TABLE 1A

| Polyesters of formulae 1 and 2 | MW, g/mol | Polydispersity (MW/Mn) |
|---|---|---|
| Example no. 1: m/n = 4/3 | 300,510 | 1.83 |
| Example no. 2: m/n = 5/3 | 247,080 | 2.06 |
| Example no. 7: m/n = 13/6 | 575,050 | 1.33 |
| Example no. 9: m/n = 13/3 | 377,860 | 3.04 |

TABLE 1B

| Polyamides of formula 3 | MW, g/mol | Polydispersity (MW/Mn) |
|---|---|---|
| Example no. 10 m/n = 5/5 | 104,000 | 1.42 |
| Example no. 11 m/n = 13/5 | — | — |
| Example no. 12 m/n = 13/6 | 112,000 | 1.36 |

TABLE 1C

| Polyamides of formula 4 | MW, g/mol | Polydispersity (MW/Mn) |
|---|---|---|
| Example no. 13: m/n = 5/4 | 426,000 | 1.65 |
| Example no. 14: m/n = 13/4 | 769,000 | 1.73 |

Cloud point (CP) measurements were performed in a water heat bath in which a 2 mL vial holding a sample of the polymer aqueous solution is immersed. The temperature of the sample is varied at a heating/cooling rate of 0.2° C./min. The temperature of the sample is measured by a thermocouple. A red light (650 nm) semiconductor laser (2 mW) passes light through the sample for detection by a Metrological photo-detector that has an accuracy of 1 $\mu$W. In order to remove any influence of heat bath turbulence, the last digit of the measurement is ignored (higher order digits exhibited insensitivity to water turbulence) resulting in measurement accuracy of 0.01 mW. The cloud points of examples 1–9A in water are shown in Table 2.

TABLE 2

Cloud Point Temperatures

| Polymer of Example No. | Hydrophilic group | Hydrophobic group | (m/n) ratio | Linkage group | Transition temperature, ° C. (at 0.1% aqueous solution) |
|---|---|---|---|---|---|
| 1 | Ethylene Oxide | Ethylene | 4/3 | Ester | 18 |
| 2 | Ethylene Oxide | Ethylene | 5/3 | Ester | 21 |
| 7 | Ethylene Oxide | Ethylene | 13/6 | Ester | 26 |
| 9 | Ethylene Oxide | Ethylene | 13/3 | Ester | 46 |
| 9A | Ethylene Oxide | <none> | 1/0 | Ether | 120 |
| 10 | Ethylene Oxide | Ethylene | 5/5 | Amide | 6.6 |
| 11 | Ethylene Oxide | Ethylene | 13/5 | Amide | 43 |
| 12 | Ethylene Oxide | Ethylene | 13/3 | Amide | 60 |
| 13 | Ethylene Oxide | Methylene-biscyclohexanamine | 5/4 | Amide | 25 |
| 14 | Ethylene Oxide | Methylene-biscyclohexanamine | 13/4 | Amide | 64 |

The polymers of the invention show a sharp transition temperature. To illustrate, the transition behavior of the polyester polymer of Example 7 where m/n=13/6 is shown in Tables 3 and 3A.

TABLE 3

| 0.1 wt. % Fraction | | 0.15 wt. % Fraction | | 0.75 wt. % Fraction | | 1.0 wt. % Fraction | |
|---|---|---|---|---|---|---|---|
| Temp. °K | laser Intensity, mW | Temp. °K | laser Intensity, mW | Temp. °K | laser Intensity, mW | Temp. °K | laser Intensity, mW |
| 294.2 | 0.968 | 279.3 | 0.85 | 291 | 1.088 | 289 | 0.889 |
| 295.3 | 0.97 | 280 | 0.849 | 292 | 1.084 | 290 | 0.888 |
| 296 | 0.972 | 281 | 0.849 | 293 | 1.085 | 291 | 0.889 |
| 297 | 0.968 | 282 | 0.851 | 294 | 1.083 | 292 | 0.889 |
| 298 | 0.967 | 283 | 0.852 | 295 | 1.082 | 293 | 0.888 |
| 299 | 0.963 | 284 | 0.852 | 296 | 1.08 | 294 | 0.886 |
| 300 | 0.953 | 285 | 0.85 | 297 | 1.075 | 295 | 0.885 |
| 301 | 0.936 | 286 | 0.851 | 298 | 1.07 | 296 | 0.886 |
| 302 | 0.916 | 287 | 0.849 | 299 | 1.061 | 297 | 0.886 |
| 302.5 | 0.9 | 288 | 0.848 | 300 | 1.052 | 298 | 0.88 |
| 303 | 0.89 | 289 | 0.847 | 300.6 | 0.955 | 299 | 0.886 |
| 303.5 | 0.882 | 290 | 0.846 | 301 | 0.536 | 299.9 | 0.646 |
| 304 | 0.862 | 291 | 0.843 | 301.5 | 0.09 | 300. | 0.501 |
| 304.5 | 0.853 | 292 | 0.841 | 302 | 0.041 | 300.1 | 0.409 |
| 305 | 0.843 | 293 | 0.842 | 302.2 | 0.012 | 300.2 | 0.266 |
| 305.5 | 0.83 | 294.5 | 0.84 | 303 | 0.05 | 300.3 | 0.136 |
| 306 | 0.815 | 295 | 0.836 | 304 | 0.02 | 300.4 | 0.086 |
| 306.5 | 0.8 | 295.5 | 0.836 | 304.5 | 0.02 | 300.5 | 0.05 |
| 307 | 0.782 | 296 | 0.836 | 305 | 0.02 | 300.6 | 0.03 |
| 307.5 | 0.773 | 297 | 0.83 | | | 300.7 | 0.016 |
| 308 | 0.755 | 297.5 | 0.83 | | | 300.8 | 0.011 |
| 309 | 0.726 | 298 | 0.82 | | | 300.9 | 0.007 |
| 310 | 0.708 | 298.2 | 0.761 | | | 301 | 0.006 |
| 311 | 0.685 | 298.3 | 0.639 | | | 301.1 | 0.005 |
| 312.5 | 0.636 | 298.5 | 0.421 | | | 301.3 | 0.004 |
| 313 | 0.619 | 298.6 | 0.28 | | | 301.5 | 0.003 |
| 314 | 0.597 | | | | | 301.6 | 0.003 |
| 315 | 0.569 | | | | | 301.7 | 0.003 |
| 316 | 0.54 | | | | | | |
| 317 | 0.515 | | | | | | |
| 318 | 0.492 | | | | | | |

TABLE 3-continued

| 0.1 wt. % Fraction | | 0.15 wt. % Fraction | | 0.75 wt. % Fraction | | 1.0 wt. % Fraction | |
|---|---|---|---|---|---|---|---|
| Temp. °K | laser Intensity, mW | Temp. °K | laser Intensity, mW | Temp. °K | laser Intensity, mW | Temp. °K | laser Intensity, mW |
| 319 | 0.468 | | | | | | |
| 320.3 | 0.443 | | | | | | |
| 321.2 | 0.43 | | | | | | |
| 322 | 0.414 | | | | | | |
| 323 | 0.396 | | | | | | |
| 324 | 0.372 | | | | | | |
| 325.5 | 0.35 | | | | | | |
| 326.2 | 0.339 | | | | | | |

TABLE 3A

| 10. wt. % Fraction | | 15 wt. % Fraction | | 20. wt. % Fraction | | 40 wt. % Fraction | |
|---|---|---|---|---|---|---|---|
| Temp. °K | laser Intensity, mW | Temp. °K | laser Intensity, mW | Temp. °K | laser Intensity, mW | Temp. °K | laser Intensity, mW |
| 293.5 | 0.878 | 295.7 | 0.886 | 299 | 0.851 | 297.5 | 0.887 |
| 294. | 0.874 | 296 | 0.889 | 300 | 0.84 | 298 | 0.882 |
| 295. | 0.868 | 297 | 0.893 | 301 | 0.84 | 298.5 | 0.879 |
| 296 | 0.868 | 298 | 0.889 | 302 | 0.838 | 299 | 0.871 |
| 297 | 0.867 | 299 | 0.889 | 303 | 0.833 | 299.5 | 0.87 |
| 298 | 0.866 | 300 | 0.886 | 304 | 0.827 | 300 | 0.87 |
| 299 | 0.863 | 301 | 0.882 | 305 | 0.822 | 301 | 0.87 |
| 300 | 0.86 | 302 | 0.872 | 306 | 0.815 | 302 | 0.87 |
| 301 | 0.853 | 303 | 0.86 | 307 | 0.793 | 303 | 0.873 |
| 302 | 0.844 | 304 | 0.862 | 307.5 | 0.775 | 304 | 0.87 |
| 303 | 0.833 | 305 | 0.845 | 308 | 0.758 | 305 | 0.869 |
| 304 | 0.822 | 306 | 0.825 | 308.5 | 0.736 | 306 | 0.865 |
| 305 | 0.794 | 307 | 0.795 | 309 | 0.7 | 307 | 0.864 |
| 305.5 | 0.771 | 307.5 | 0.76 | 309.1 | 0.678 | 308 | 0.866 |
| 306 | 0.734 | 308 | 0.76 | 309.2 | 0.669 | 309 | 0.866 |
| 306.5 | 0.72 | 308.5 | 0.58 | 309.3 | 0.656 | 310 | 0.862 |
| 306.6 | 0.708 | 309.1 | 0.028 | 309.4 | 0.64 | 311 | 0.865 |
| 306.7 | 0.045 | 309.2 | 1.00E−03 | 309.5 | 0.625 | 312 | 0.863 |
| 306.8 | 0.004 | | | 309.6 | 0.603 | 313 | 0.858 |
| 306.9 | 1.00E−03 | | | 309.7 | 0.553 | 314 | 0.864 |
| 307 | 0.726 | | | 309.8 | 0.552 | 315 | 0.855 |
| | | | | 309.9 | 0.484 | 316 | 0.82 |
| | | | | | 0.47 | 316.4 | 0.775 |
| | | | | | 0.458 | 317 | 0.039 |
| | | | | | 0.438 | 317.1 | 1.00E−03 |
| | | | | | 0.403 | | |
| | | | | | 0.214 | | |
| | | | | | 0.16 | | |
| | | | | | 0.072 | | |
| | | | | | 1.00E−03 | | |

Surface Grafted Temperature Responsive Polymers

In another aspect, the temperature responsive polymers are grafted onto the surface of a substrate by use of a self assembled monolayer (SAM) that is previously deposited onto a substrate such as metal, polymer, glass or silicon. Examples of molecules that may be used for the SAM are α-/chloro- or ethoxy- or methoxy-/silanes-ω-/amino or carboxy or nitrile or cyanide or hydroxy/alkyls, or the respective ω-functionalized α-thiols. SAM can be formed using the a single species or a mixture of the above mentioned molecules. The composition of the mixture allows to control surface grafting density of the polymer to be end-grafted thereon. Yet in another way to control grafting density, reaction of single species SAM with a mixture of organic difunctional and monofunctional compounds, where the reaction is possible through the ω-functionality of the SAM and the end-grafting of the polymers will occur only from the difunctional molecules.

The grafted polymer may be grown on the SAM by two methods. In both methods, the end-groups of the polymer and the active groups of the SAM may be interchanged with any pair of groups which may react to produce grafting. In a first method, growth of temperature responsive grafted polymer which has hydrophobic and hydrophilic alternations may be achieved by immersion of the treated substrate that bears a SAM layer into a 10% solution of ethylene oxide diacid chloride (m=13 or m=5). The immersion is done in chloroform at room temperature for a period of 5 min, and the surface then is washed with chloroform for a period of 10 min. Then the treated substrate bearing the SAM layer is immersed into a 10% solution of a dodecane diol or hexane diol (n=6 or n=3 hydrophobic groups correspondingly) in chloroform for a period of 5 minutes and surface is washed with chloroform for 10 min. Growth of the polymer may be achieved by repeating the above cycle, i.e., (immersion in the oligo(ethylene oxide) diacid solution for 5 mn, washing, immersion in oligo(ethylene)-diol solution, washing) until the desired polymer length is reached.

After completion of a set of 50 of the above cycles, the treated substrate, which now bears end-tethered polymers, is washed with chloroform, ethanol and water, and further ultrasonically cleaned in neat chloroform for a period of 5 minutes and then in DD water for a period of five minutes to remove any non-grafted molecules.

In a second method, growth of grafted polymer may be achieved by using a substrate bearing a mixed-SAM that has a controlled surface density of functional ω-groups, such as alcohols, amines, carboxylic acids, and carboxylic-acid-chlorides. The treated substrate is immersed for a period of 15 minutes at room temperature into a 5 wt % solution of separately synthesized polymer (e.g., polyester (m/n)=13/6 or polyester (m/n)=13/3, as described in the examples 6 and 9) bearing a end-functional group able to react with the SAM ω-functionality.

Growth of Grafted Polymers

Prior to growth of grafted polymer, a SAM is generated on a substrate. The substrate may be, for example, a silicon wafer such as that from Monsanto or a glass cover slide such as that from VWR, Inc. First the substrate is cleaned by immersion into a piranha etch that includes sulfuric acid and hydrogen peroxide in a volume ratio of 50:1 at 120° C. for two hours, and then rinsing with distilled deionized (DD) water. The substrate then is further cleaned in a RF plasma cleaner for five minutes. The substrate is subsequently immersed into 0.4% solution of aminopropyltriethoxy silane (APTES) in toluene for 1 hour to form the SAM.

The SAM bearing substrate is subsequently washed with ethanol and with DD water, and then annealed in a vacuum oven overnight at 170° C. Then the SAM modified substrate is immersed in a 100 mL chloroform solution of mixture of myristic acid chloride and ethyleneoxide diacid chloride (EO=5 and 13) containing 60/40 and 80/20 weight percent ratios respectively. This forms a surface with randomly distributed active sites wherefrom the end-tethering of the thermally sensitive polymers is enabled, thus allowing for control of the polymer grafting density.

Alternatively, a selected composition, for example a 20:80 of ω-functionalized and methyl-terminated surfactants may be deposited as a SAM directly in one step to effectively create a similar random distribution of active sites, wherefrom the end-tethering of the thermally sensitive polymers is enabled, thus also allowing for control of the grafting density.

Growth of grafted polymers is further illustrated by reference to the following non limiting examples:

Example 16

Growth of Polymer of Formula (1), where (m/n)=4/3 Onto a Glass Substrate Bearing a APTES SAM Layer The substrate treated according the procedure described above is immersed into the 10 wt % solution of 1,6-hexanedicarboxy chloride in chloroform for 5 minutes at room temperature. It then is washed with chloroform for 10 minutes and immersed into the 10 wt % solution of oligo (ethylene glycol) Mw=200 g/mol in chloroform. Then the substrate is again washed with chloroform and immersed in the first solution (i.e. solution of 1,6-hexane dicarboxy chloride). The cycle is repeated 50 times. Then the substrate is cleaned as described above.

Example 17

Growth of Polymer of Formula (2), where (m/n)=13/3 Onto a Glass Substrate Bearing a APTES SAM Layer The substrate treated according the procedure described in Example 16 is subjected to the polymer grafting procedure described in Example 16. The bis(chlorocarboxymethyl) (13)-ethyleneoxide is used as a oligo(ethylene oxide) diacid chloride and 1,6-hexane diol is used as a diol.

Example 18

Growth of Polymer of Formula (3), where (m/n)= 13/5 Onto a Glass Substrate Bearing a APTES SAM Layer The substrate treated according the procedure described in Example 16 is subjected to the polymer grafting procedure described above where the SAM modified substrate is treated with the solution of mixture of myristic acid chloride. Polymer of a formulae (3) containing m=13 ethylene oxide groups and n=5 ethlyene groups is synthesized separately as described in Example 11.

Example 19

Growth of Polymer of Formula (4), where (m/n)= 13/4 Onto a Glass Substrate Bearing a APTES SAM Layer The substrate is treated and the polymer is grafted as in example 18 except that 4,4'-methylene-bis(cyclo-hexanamnine) is used instead of diol.

The grafted polymers are characterized by water contact angle measurements by sessile drop method using FT Å2000 (First Ten Angstroms Inc.) contact angle and surface tension measurement system and atomic force microscope (AFM) PicoScan (Molecular Imaging Inc.) and Nanoscope III (Veeco) adhesion measurements under water. Each of these measurements shows that the sharp temperature response of the polymers is retained after having been grafted. The measurements also show that the control of the transition temperature depends on (m/n) fraction (where, m is the number of hydrophilic groups, and n is the number of hydrophobic groups which constitute the polymer). In addition, the temperature response of the polymer is independent of the polymer grafting density, the type of grafting group which includes but is not limited to functional end groups of the SAM preferably amine, hydroxyl, carbonyl, nitrile and vinyl, the molecular weight of the grafted polymer, the substrate material and geometry, as well as the SAM chemistry and geometry.

Advantageously, as shown in Tables 4, 5A and 5B, the temperature response of the grafted polymers enables switching the surface energy and surface adhesion between different values which correspond to extended and collapsed chain conformations of the grafted polymer.

Advantageously, the grafted polymers may achieve temperature responsive adsorption/release of synthetic molecules, biomolecules, proteins, cells, droplets, particles and the like from the surface of the SAM layer on the substrate.

TABLE 4

Contact Angle Measurements Data of Surface Adhesion Energy for Polyester of Formula (2) of Example 7 where (m/n) = 13/6

| Temperature, ° C. | Adhesion energy, J |
| --- | --- |
| 79 | 0.10035 |
| 60 | 0.10695 |
| 46 | 0.11231 |
| 38 | 0.11539 |

TABLE 4-continued

Contact Angle Measurements Data of Surface
Adhesion Energy for Polyester of Formula (2)
of Example 7 where (m/n) = 13/6

| Temperature, °C. | Adhesion energy, J |
|---|---|
| 29 | 0.12107 |
| 24 | 0.13432 |

TABLE 5A

AFM measurement data of adhesion energy of
Polyester of Formula (2) of Example 9 where
(m/n = 13/3)

| Temperature, °C. | adhesion energy, J |
|---|---|
| 24 | 7.2502E−4 |
| 37.5 | 5.38748E−4 |
| 45.3 | 5.81031E−4 |
| 54 | 3.26203E−4 |
| 63.2 | 2.49078E−4 |

TABLE 5B

AFM measurement data of adhesion energy of
Polyester (2) of Example 7 where m/n = 13/6

| Temperature, °C. | adhesion energy, J |
|---|---|
| 17 | 5.12934E−4 |
| 21 | 6.17733E−4 |
| 23 | 5.32335E−4 |
| 26 | 6.4147E−4 |
| 35 | 1.40377E−4 |
| 45 | 9.83022E−5 |

The surface grafted, temperature responsive polymers of the invention may be employed in a variety of applications such as pharmaceutical, biotechnological, microelectromechanical and chemical applications such as controlled drug delivery systems, DNA transfection applications, cell adhesion regulation applications, chemical processing systems and microfluidic cells. A microfluidic cell includes a microchannel grid which may be made from poly(dimethylsiloxane) (PDMS). Electrodes may be attached on two opposing sides of the grid.

The microchannel grid can be made by pouring uncured PDMS into a mold that has holes which measure 200 nm deep by 5 mm wide×5 mm long. Then PDMS is cured for 2 hours at 65° C. The cured PDMS then is peeled from the mold and cured at 65° C. for an additional 10 hours. The surface of the micro channel grid is made hydrophilic by irradiating it with UV light and/or oxygen plasma for 2 to 5 minutes.

Advantageously, the geometry and material of the channels in the grid do not affect the sharp transition temperatures of the polymers of the invention. Grafting of a temperature responsive polymer onto the microchannel grid of PDMS may be performed as described above in connection with grafting of polymer onto a SAM on glass substrate. Grafting may be achieved directly onto the microchannel grid as well as onto the substrate where the fluidic geometry is attached. Manufacture of a microfluidic cell that employs the microchannel grid is illustrated in example 20.

Example 20

A glass substrate bearing a grafted polymer as produced in example 18 is placed onto a controlled temperature stage device that automatically maintains a preset temperature with high accuracy. An example of such a device is the "High Temperature Stage" from Molecular Imaging Corp. fitted with 321 Autotuning Temperature Controller of Lakeshore Cryotronics Inc.

Electrodes are placed onto the surface of the substrate and 10 mL of 0.01% solution of methylene blue is poured between the electrodes. The microchannel grid is fixed onto the substrate so that the micro channels face the substrate and cover the electrodes to confine the methylene blue solution to the microchannels. A voltage then is applied to the electrodes. The applied voltage may vary with the fluidic material in the microchannels. For instance, a voltage of 1–2 V is used with alkali cations. a voltage of 1–3 V is used with cationic dyes; a voltage of 1–12 V is used with DNA/RNA biomolecules. The extent of transport, e.g, ionic current, DNA mass, and the like is measured using PM2525 multimeter of Fluke Inc. while varying the temperature of the substrate.

The ionic conductivity for methylene blue is measured by measuring the electrical current generated by a 3V potential between the electrodes. The results are shown in Table 6.

TABLE 6

Conductivity measurement data of Polyester (2) of
Example 7 where m/n = 13/6 as a valve in
a microfluidic channel

| Temperature, °C. | Current, μA |
|---|---|
| 22 | 0.5511 |
| 23 | 0.629 |
| 24 | 0.6716 |
| 25 | 0.707 |
| 26 | 0.7311 |
| 27 | 0.7393 |
| 28 | 0.7457 |
| 31 | 0.7538 |
| 37 | 0.7642 |
| 42 | 0.766 |

What is claimed is:

1. A microfluidic device having a temperature responsive polymer and a conductive fluid comprising, a substrate bearing a grafted temperature responsive polymer thereon, electrodes in contact the substrate so as to contain a conductive fluid therebetween, a microchannel grid in contact with the substrate whereby micro channels of the grid face the substrate and cover the electrodes to confine the conductive fluid to the microchannels, wherein the grafted polymer comprises one of the following polymers:

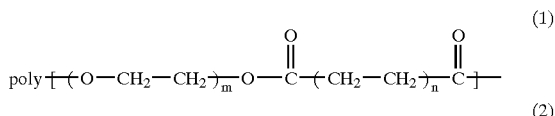

(1)

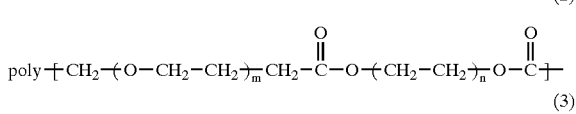

(2)

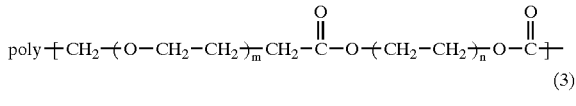

(3)

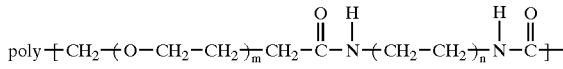

-continued

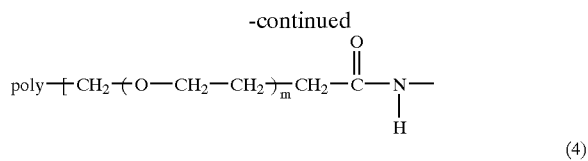

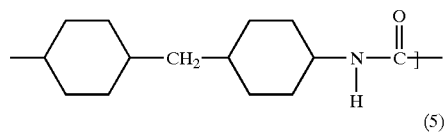

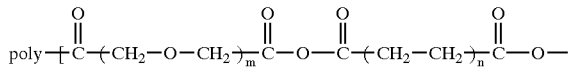

wherein $1 \leq m \leq 30$ and $1 \leq n \leq 30$.

2. The device of claim 1 wherein the conductive fluid comprises methylene blue.

3. A temperature sensitive, water soluble polymer that has a lower critical solution temperature of from about 7° C. to about 70° C., wherein the monomeric unit of the polymer contains a number (m) of hydrophilic organic groups and a number (n) of hydrophobic organic groups, connected via organic linking groups.

4. The temperature sensitive polymer of claim 3, where the hydrophilic group is ethylene oxide and the hydrophobic group is ethylene.

5. The temperature sensitive polymer of claim 3, wherein the polymer has the formula:

wherein the number of hydrophilic groups (m) is between 1 and 30, and number of hydrophobic groups (n) is between 1 and 30.

6. The temperature sensitive polymer of claim 3, where the hydrophilic and hydrophobic groups are randomly placed along a linear polymer molecule with the same ratio m/n and are not clustered in hydrophilic-only or hydrophobic-only sequences with more than 30 homologous (hydrophilic or hydrophobic) groups in each sequence.

7. An aqueous composition, comprising: a water soluble polymer of claim 3.

8. The aqueous composition of claim 7, wherein the hydrophilic component of the water soluble polymer is selected from the group consisting of: ethylene oxide, methylene oxide, vinyl alcohol, acrylamide, acrylate, propylene oxide, acrylic-acid, methacrylic-acid, and methyl-acrylic-acid.

9. The aqueous composition of claim 7, wherein the hydrophobic component of the water soluble polymer is selected from the group consisting of: ethylene, or propylene, or isobutelene, C4–C10 cycloaliphatic, cyclopropane, cyclobutane, cyclopentane, cyclohexane, furan, vinyl groups, acrylonitriles, methyl-methacrylate, semi-inorganic acrylic, aromatic groups, benzene, phenylene, carbohydrates, amylose, cellulose, cellulose nitrade, diene groups, butadiene, chloroprene, isoprene, norbornene, anhydride groups, DNA/RNA bases, ester groups, ether groups, ketone groups, sulfone and ether sulfone groups, nitrile groups, peptide groups such as protein groups, alanine, glutamate, collagen, gelatin, glycine, and lysine, saccharide groups, silane groups, methyl-phenyl-silylene, mono-alkyl- and di-alkyl-silylene, silazane groups, silazane, mono-alkyl- and dialkyl-silazane, vinylidene chlorides, vinylidene fluorides, isobutylene, multi-fluoro- and multi-chloro-alkenes, and fluoropolymer groups, tetrafluoro-ethylene, perfluorinated and semifluorinated ethers, fluoro vinyledenes, perfluorinated and semifluorinated aromatic rings, perfluorinated and semifluorinated C4–C10 cyclo aliphatics.

10. A method of controlling the lower critical solution temperature (LCST) of a water soluble polymer that has an LCST of from about 7° C. to about 70° C. in water, wherein the polymer is made from a ratio m/n of (m hydrophilic organic groups)/(n hydrophobic organic groups), connected via organic linking groups, the method comprising:

controlling the LCST temperature sensitivity by varying the m/n ratio, while maintaining the polymer microstructure of a linear chain and avoiding clustering in hydrophilic-only or hydrophobic-only sequences with more than 30 homologous (hydrophilic or hydrophobic) groups in each sequence.

11. The method of claim 10 comprising controlling the LCST temperature sensitivity by varying the m/n ratio, while avoiding clustering in hydrophilic-only or hydrophobic-only sequences with more than 30 homologous (hydrophilic or hydrophobic) groups in each sequence and maintaining a mostly linear polymer microstructure with short branches, wherein the branches are not hydrophilic-only or hydrophobic-only sequences and the polymer backbone is not a hydrophilic-only or hydrophobic-only sequence.

12. The temperature sensitive polymer of claim 3, wherein the hydrophilic and hydrophobic groups alternate.

* * * * *